(No Model.) 2 Sheets—Sheet 1.
W. S. G. BAKER.
CAR BRAKE.
No. 566,052. Patented Aug. 18, 1896.
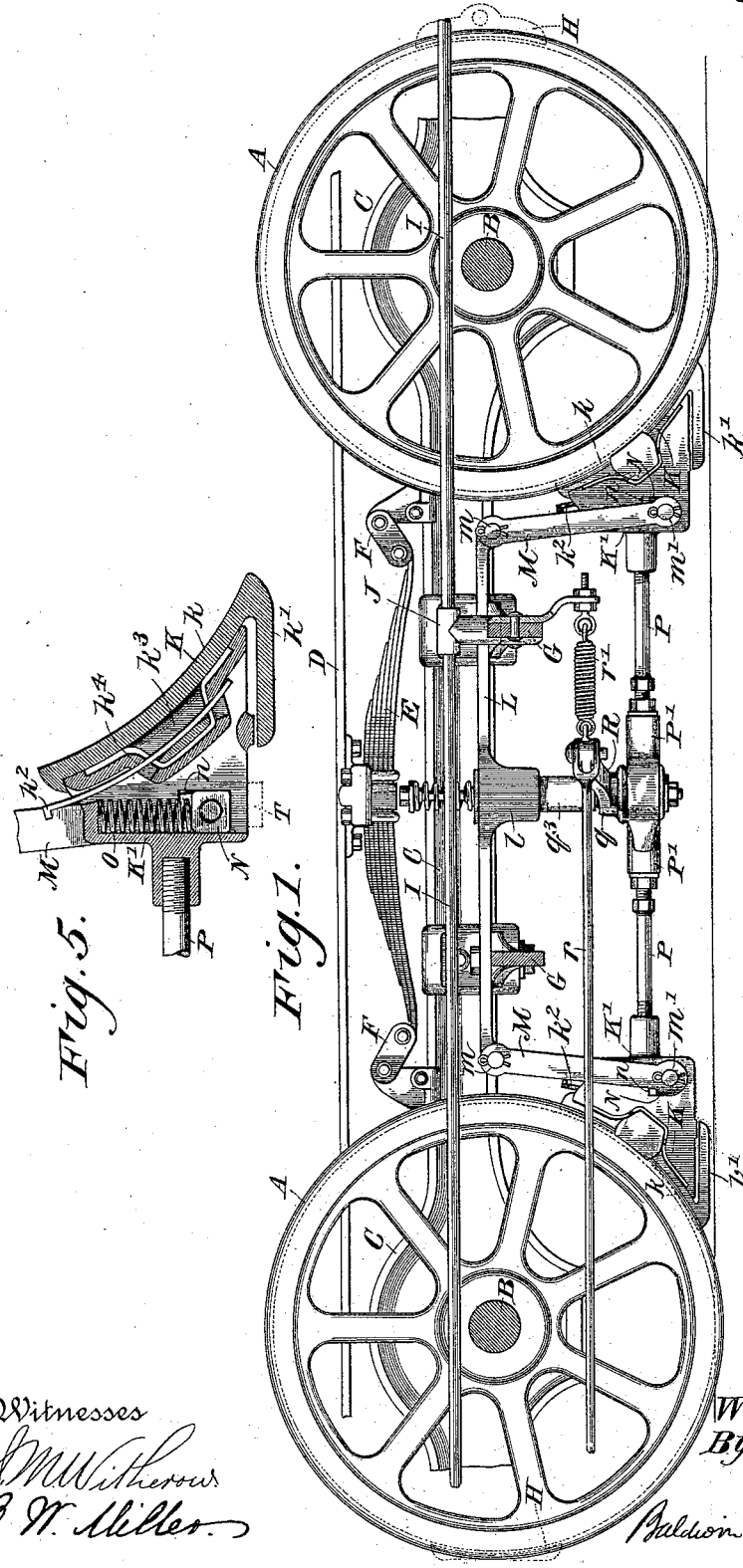
Witnesses
J. M. Witherow
B. W. Miller
Inventor,
Wm. S. G. Baker,
By his Attorneys,
Baldwin Davidson Wight.

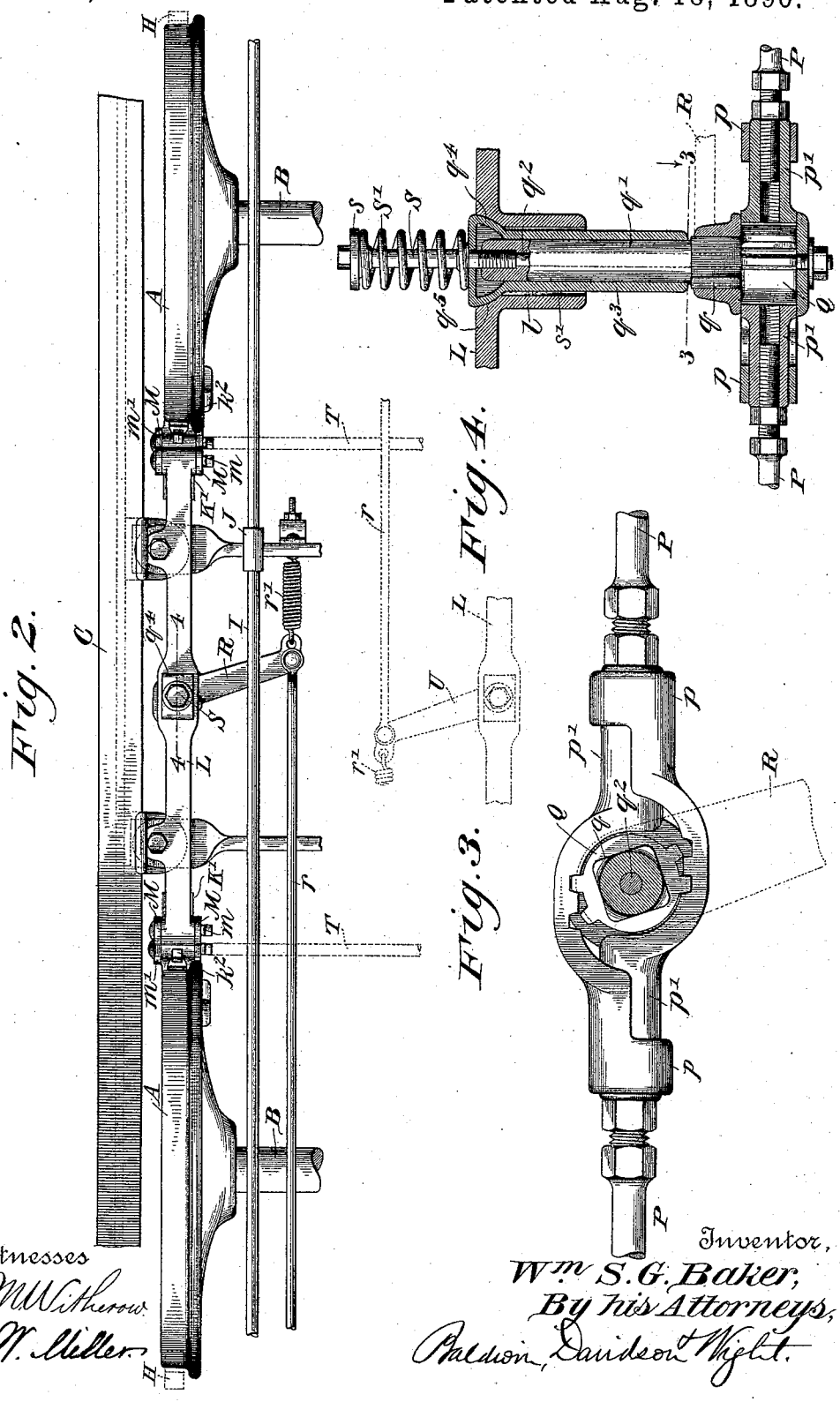

UNITED STATES PATENT OFFICE.

WILLIAM S. G. BAKER, OF BALTIMORE, MARYLAND.

CAR-BRAKE.

SPECIFICATION forming part of Letters Patent No. 566,052, dated August 18, 1896.

Application filed November 29, 1895. Serial No. 570,447. (No model.)

*To all whom it may concern:*

Be it known that I, WILLIAM S. G. BAKER, a citizen of the United States, residing at Baltimore, in the State of Maryland, have invented certain new and useful Improvements in Car-Brakes, of which the following is a specification.

My present invention relates particularly to brake mechanism adapted for street-cars and operated by manual power, but certain parts of my improvements may be used on other vehicles and may be operated by other power.

Ordinarily a single brake is applied to each wheel of a four-wheeled truck and all of these brakes are operated simultaneously by a single rod. Should this rod break, the entire brake mechanism is rendered inoperative. It has heretofore been proposed, as a remedy for this contingency, to provide supplemental or emergency brakes operated by a supplemental rod which is controlled by the motorman or other attendant who has charge of the ordinary brake mechanism.

The improved brake mechanism which I employ is especially adapted to be used in connection with the ordinary brakes to act as emergency-brakes, but it has many points of novelty which render it efficient whether used with the ordinary brakes or not. The details of construction of the mechanism which I employ are hereinafter fully described. They are shown in the accompanying drawings, in which—

Figure 1 shows a longitudinal section of a four-wheeled car-truck with my improved brake mechanism applied. Fig. 2 shows a top plan of one side of the same. Fig. 3 shows a transverse section of the vertical brake-operating rock-shaft on the line 3 3 of Fig. 4. Fig. 4 shows a vertical central section on the line 4 4 of Fig. 2, and Fig. 5 a vertical section through one of the brake-blocks. Fig. 3, 4, and 5 are on an enlarged scale.

The wheels A, axles B, and the side beams C of the truck may be of any usual construction.

The car-body may be mounted on bars D, resting on springs E, supported on the side beams at F.

The special construction of the truck proper forms no part of my present invention. The truck shown is especially adapted to support an electric motor or electric motors. Cross-beams G are supported on the side beams and constitute supports for the motors in the usual way.

I have shown in the drawings brake mechanism on one side only of the truck, that on the opposite side being merely a duplicate of that shown.

H indicates brakes of the usual construction applied in the usual way, and I a rod for operating these brakes, said rod, as shown, being guided in a bracket J, mounted on one of the cross-beams G. The supplemental or emergency brakes are adapted to bear both on the wheels and on the tracks. Each brake-shoe K is curved at $k$ to fit the wheel, and on its under side $k'$ is shaped to fit the track. The brake-head K' is connected with the brake-shoe by a locking-pin $k^2$, which extends through a lug $k^3$ on the shoe and through the walls of the corresponding socket $k^4$ on the brake-head.

The brake-head is suspended from a frame L by two links M, pivoted at $m$ to the frame L, and pivotally connected at their lower ends $m'$ to a block N. This block is arranged to move vertically in a slot $n$ in the brake-head. Normally the brake-head is lifted away from the track by means of a spring O, interposed between the top of the brake-head and the top of the block N, the brake-head being hollow to accommodate the spring, as shown in Fig. 5. All of the brakes are constructed in a similar way.

A brake-operating rod P is secured to each brake-head, and each of said rods is secured to a curved rack P'. Each of said racks is provided with a guide-sleeve $p$ for the arm $p'$ of the sister rack, the arrangement being such that the two brakes on one side of the truck are joined by the brake-rods P and curved racks P', which latter are coupled by the sleeves $p$. A pinion Q is arranged to operate the racks to move them past each other, so as to apply the brakes to the wheels or to withdraw them therefrom. The pinion is operated by a lever R, which is connected with a brake-rod $r$, extending to a lever, crank, or wheel in reach of the motorman or other attendant. An adjustable relief-spring $r'$ is secured to the lever R and operates to relieve the brakes when the brake-rod-operating mechanism is released. The lever R, it will be observed, is provided with a square head $q$, which is rigidly connected with a vertical sleeve $q'$, through which extends a bolt $q^2$. Around the sleeve $q'$ there is another sleeve, $q^3$, and this sleeve, at its upper end, is provided with a head $q^4$, having a curved or under side resting in a correspondingly-shaped seat $q^5$ in the bar L, which at this point is provided with a housing $l$.

A bolt S is secured to the sleeve $q'$ and extends up through the head $q^4$. At its upper end it is provided with a plate $s$, and between this plate and the top of the head $q^4$ is interposed a coiled spring S'. This spring tends to hold up the sleeve $q'$ and all of the parts connected therewith, but allows it to move down vertically to a slight extent when required. There is a slight space $s'$ between the sleeve $q'$ and the housing $l$, which allows the sleeve, and of course the parts which it incloses, to have a slight rocking movement.

When the brakes are applied, they first move toward the wheels in a straight horizontal line and then move downwardly toward the tracks. The brake-shoes still maintain their horizontal position, but being allowed to move vertically downward by reason of the manner of connecting the blocks N with the brake-heads, the springs K' allowing a sufficient vertical movement for this purpose. It is, of course, understood that the vertical movement of the brake-heads is caused by the inclined surfaces of the wheels and the brake-shoes, the horizontal movement of the brake-rods P ultimately effecting this vertical movement.

In order that the brakes may be applied equally to both wheels, I provide for a slight movement of the pinion and its shaft. By referring to Fig. 4 it will be seen that the shaft of the pinion may rock longitudinally to a limited extent, and it will also be observed that the pinion and its shaft and supporting devices may move vertically to an extent sufficient to accommodate the vertical movement of the brakes, the spring S' permitting such vertical movement. The brakes on each side of the car may be operated by a separate brake-rod $r$. One brake-rod may lead to the motorman's platform and the other to the conductor's platform. It is obvious, also, that the brakes may be cross-connected, as indicated by dotted lines at T. I have indicated at U the brake-operating lever for the brakes on the opposite side of the car.

The mechanism which I have adopted for applying the brakes is strong and powerful. The manner in which the brake-heads are hung enables them to be applied evenly to the wheels and track, and when the brake-rods are released and the brake-heads withdrawn they will be raised to their normal position by their spring-supports. The manner of mounting the brake-operating rock-shaft admits of even and powerful action of the brakes. A slight longitudinal movement is allowed and also a sufficient vertical movement to accommodate the vertical movement of the brakes.

For some cars or other vehicles the brakes which I have termed the "emergency-brakes" may be found sufficient for all purposes, but I preferably employ them in connection with the ordinary brake mechanism above described.

It will be observed that the brake mechanism is so arranged that the entire structure always keeps a horizontal plane, and the brake-rods P move in the same horizontal plane toward and from each other. By this arrangement the maximum effect is produced.

I claim as my invention—

1. The combination, substantially as hereinbefore set forth, with the wheels, of the brake-shoes, the brake-heads secured thereto, the suspending-links, the blocks attached thereto and springs interposed between the blocks and the brake-heads.

2. The combination, substantially as hereinbefore set forth, of the wheels, the brake-shoes, the brake-heads attached thereto, the suspending-links, the blocks at their lower ends extending through slots in the brake-heads, and springs interposed between the blocks and the brake-heads.

3. The combination, substantially as hereinbefore set forth, of the brake-heads, the curved racks connected therewith, a pinion for operating said racks, a lever for operating the pinion and a loosely-mounted pinion-supporting rock-shaft.

4. The combination, substantially as hereinbefore set forth, of the brake-shoes, the brake-heads, links suspending the brake-heads, the curved racks attached to the brake-heads, a pinion for operating the racks, means for operating the pinion, a vertical shaft with which the pinion is connected, a housing in which the shaft has a rocking bearing, and a spring for holding the shaft seated in said housing.

5. The combination with the wheels of the brake-shoes adapted to move toward and from the wheels and vertically toward and from the tracks, and the brake-shoe-operating mechanism operating to move said brake-shoes in opposite directions against the wheels, and adapted to move toward and from the wheels and vertically correspondingly with and to the same extent as the brake-shoes.

6. The combination, substantially as hereinbefore set forth, with the wheels, of the brake-shoes, the brake-heads secured thereto, the suspending-links and springs attached to the links for permitting the vertical movement of the brake-shoes.

In testimony whereof I have hereunto subscribed my name.

WILLIAM S. G. BAKER.

Witnesses:
J. PAUL BAKER,
DANL. W. POWELL.